(12) United States Patent
Akiyama

(10) Patent No.: US 12,502,745 B2
(45) Date of Patent: Dec. 23, 2025

(54) PROCESSING MACHINE AND PRODUCTION METHOD FOR OBJECT SUBJECT TO PROCESSING

(71) Applicant: SHIBAURA MACHINE CO., LTD., Tokyo (JP)

(72) Inventor: Takanobu Akiyama, Shizuoka (JP)

(73) Assignee: SHIBAURA MACHINE CO., LTD., Tokyo (JP)

( * ) Notice: Subject to any disclaimer, the term of this patent is extended or adjusted under 35 U.S.C. 154(b) by 127 days.

(21) Appl. No.: 18/293,392

(22) PCT Filed: Aug. 19, 2022

(86) PCT No.: PCT/JP2022/031311
§ 371 (c)(1),
(2) Date: Jan. 30, 2024

(87) PCT Pub. No.: WO2023/042602
PCT Pub. Date: Mar. 23, 2023

(65) Prior Publication Data
US 2024/0326190 A1 Oct. 3, 2024

(30) Foreign Application Priority Data

Sep. 14, 2021 (JP) .................................. 2021-149139

(51) Int. Cl.
*B23Q 11/10* (2006.01)
*B23C 5/28* (2006.01)
*B23Q 11/14* (2006.01)

(52) U.S. Cl.
CPC ................ *B23Q 11/10* (2013.01); *B23C 5/28* (2013.01); *B23Q 11/146* (2013.01)

(58) Field of Classification Search
CPC .......... B23Q 11/10; B23Q 11/146; B23C 5/28
See application file for complete search history.

(56) References Cited

U.S. PATENT DOCUMENTS

| 4,208,256 | A | * | 6/1980 | Inoue | .................... | B23Q 11/10 |
| | | | | | | 205/641 |
| 6,669,532 | B1 | * | 12/2003 | Mukai | .................... | B24B 55/02 |
| | | | | | | 451/449 |

(Continued)

FOREIGN PATENT DOCUMENTS

| JP | 2002331441 A | 11/2002 |
| JP | 2010167504 A | 8/2010 |

OTHER PUBLICATIONS

International Search Report and Written Opinion issued in Application PCT/JP2022/031311, dated Sep. 20, 2022.

*Primary Examiner* — Omar Flores Sanchez
(74) *Attorney, Agent, or Firm* — DLA Piper LLP (US)

(57) ABSTRACT

In a processing machine, a machine body drives at least one of a workpiece and a tool to process the workpiece by the tool. A processing chamber isolates the workpiece, the tool, and a nozzle from at least part of the machine body while housing the workpiece, the tool, and the nozzle. An internal temperature sensor measures a temperature of an atmosphere in the processing chamber. An external temperature sensor measures a temperature of an atmosphere around the processing machine. A temperature adjustment part raises a temperature of the processing fluid to be supplied to the nozzle when a measured temperature of the internal temperature sensor is lower than a measured temperature of the external temperature sensor, and/or the temperature adjustment part lowers the temperature of the processing fluid to be supplied to the nozzle when the measured temperature of the internal temperature sensor is higher than the measured temperature of the external temperature sensor.

6 Claims, 6 Drawing Sheets

(56) References Cited

U.S. PATENT DOCUMENTS

| | | | |
|---|---|---|---|
| 10,112,202 B1* | 10/2018 | Dichter | B04C 9/00 |
| 2017/0297158 A1* | 10/2017 | Nerling | B23Q 11/10 |
| 2019/0270170 A1* | 9/2019 | Arai | B23Q 11/1053 |
| 2020/0164475 A1* | 5/2020 | Li | B23C 5/10 |
| 2020/0398396 A1* | 12/2020 | Hashimoto | G05B 19/404 |
| 2022/0260290 A1* | 8/2022 | Mimura | F25B 43/02 |
| 2024/0326190 A1* | 10/2024 | Akiyama | B23Q 11/10 |
| 2025/0065462 A1* | 2/2025 | Mathew | B23Q 11/10 |

* cited by examiner

PROCESSING MACHINE AND PRODUCTION METHOD FOR OBJECT SUBJECT TO PROCESSING

CROSS REFERENCE TO RELATED APPLICATIONS

This application is a U.S. National Stage Application of International Application No. PCT/JP2022/031311 filed Aug. 19, 2022, which claims priority from Japanese Patent Application No. 2021-149139 filed Sep. 14, 2021. The entirety of all the above-listed applications are incorporated herein by reference.

TECHNICAL FIELD

The present disclosure relates to a processing machine and a method for manufacturing a processed object.

BACKGROUND ART

Known in the art is a processing machine which performs processing (for example cutting) on a workpiece by a tool (for example the following PTL 1). PTL 1 discloses a cutting device (processing machine) which uses a cutting blade (tool) having a cutting edge on its outer periphery and divides a wafer (workpiece). The depth of cut with respect to the workpiece by the cutting blade is specified based on the amount of movement of the cutting blade from a predetermined reference position to the workpiece side. A region where cutting is carried out is supplied with cutting water.

In PTL 1, the following issue is explained relating to the cutting device described above. If the temperature in the room in which the cutting device is set changes or the temperature of the cutting water changes, thermal distortion occurs in a member configuring the cutting device, therefore the reference position deviates from the position at the time when the reference position was measured. In a situation where the cutting device is set up in a clean room and the room temperature and the temperature of the cutting water are controlled to constant temperatures, the problem of thermal distortion such as described above does not arise much at all. However, depending on the country, sometimes the cutting device is set and the cutting work is performed in a usual factory.

Further, in order to solve the problem as described above, PTL 1 proposes to control the temperature of the cutting water in accordance with the temperature in the room so as to cancel the influence of thermal distortion. Specifically, when a room temperature different from the room temperature at the time of measurement of the reference position is detected, the temperature of the cutting water is controlled based on a map setting in advance the relationship between room temperature and water temperature.

PTL 1 further alludes to the following point as well. In general, the cutting region is surrounded by a partition. The temperature inside the partition sometimes differs from the temperature in the room in which the cutting device is set. Therefore, desirably the temperature inside the partition is detected independently from the temperature in the room. The temperature of the cutting water may be adjusted in accordance with the temperature in the room in which the cutting device is set and the temperature inside the partition.

CITATION LIST

Patent Literature

PTL 1: Japanese Patent Publication No. 2010-167504

SUMMARY OF INVENTION

Technical Problem

As described above, PTL 1 states that problem of thermal distortion does not arise much at all in a situation where the cutting device is set in a clean room and the room temperature and cutting water temperature are controlled to constant temperatures. However, even in such a situation, sometimes the expected processing accuracy could not be obtained.

A processing machine and method for manufacturing a processed object which are able to improve the processing accuracy have been awaited.

Solution to Problems

A processing machine according to one aspect of the present disclosure is a processing machine in which a nozzle supplying a processing fluid to a region where a workpiece is processed by a tool is arranged, including a machine body which drives at least one of the workpiece and the tool to process the workpiece by the tool, a processing chamber which isolates the workpiece, the tool, and the nozzle from at least part of the machine body while housing the workpiece, the tool, and the nozzle, an internal temperature sensor which measures a temperature of an atmosphere in the processing chamber, an external temperature sensor which measures a temperature of an atmosphere around the processing machine, and a temperature adjustment part which performs at least one of an operation of raising a temperature of the processing fluid to be supplied to the nozzle when a measured temperature of the internal temperature sensor is lower than a measured temperature of the external temperature sensor and an operation of lowering the temperature of the processing fluid to be supplied to the nozzle when the measured temperature of the internal temperature sensor is higher than the measured temperature of the external temperature sensor.

A method for manufacturing a processed object according to one aspect of the present disclosure includes a processing step of using a processing machine includes a machine body which drives at least one of a workpiece and a tool and a processing chamber which isolates the workpiece, the tool, and the nozzle from at least part of the machine body while housing the workpiece, the tool, and the nozzle to process the workpiece to the processed object by the tool, a supply step of supplying the processing fluid from the nozzle to a region where the workpiece is processed by the tool in parallel with the processing step, an internal measurement step of measuring a temperature of an atmosphere in the processing chamber, an external measurement step of measuring a temperature of an atmosphere around the processing machine, and a temperature adjustment step of performing at least one of an operation of raising a temperature of the processing fluid to be supplied to the nozzle when a measured temperature in the internal measurement step is lower than a measured temperature in the external measurement step and an operation of lowering the temperature of the processing fluid to be supplied to the nozzle when the measured temperature in the internal measurement step is higher than the measured temperature in the external measurement step.

Advantageous Effect of the Invention

According to the above configuration or procedure, the processing accuracy can be improved.

DESCRIPTION OF EMBODIMENTS

First, an outline of a processing machine according to an embodiment of the present disclosure will be explained, then details of the processing machine will be explained.
(Outline of Processing Machine)

Figure 1:
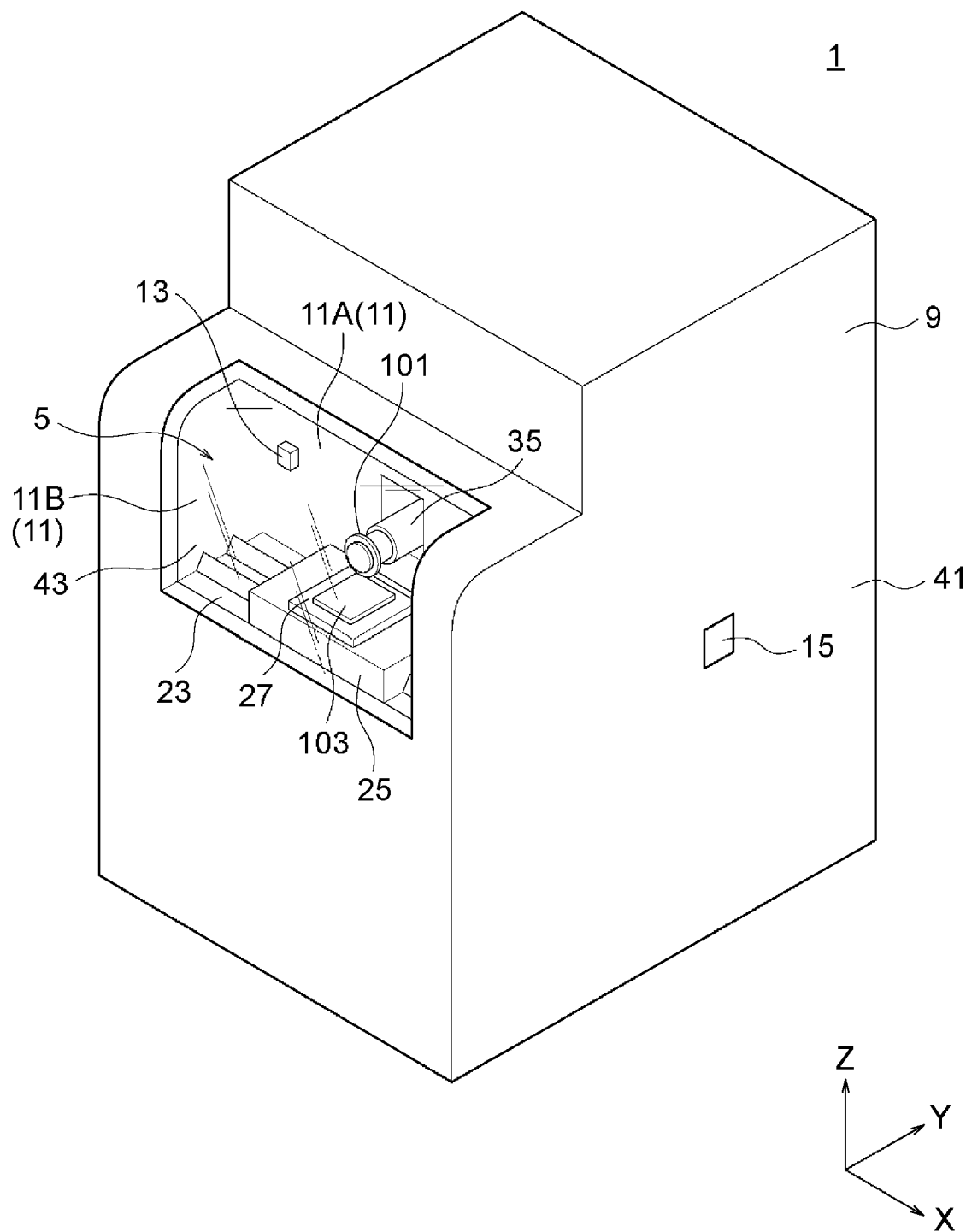
FIG. 1 is a schematic perspective view showing an appearance of a processing machine according to an embodiment of the present disclosure.
Figure 2:
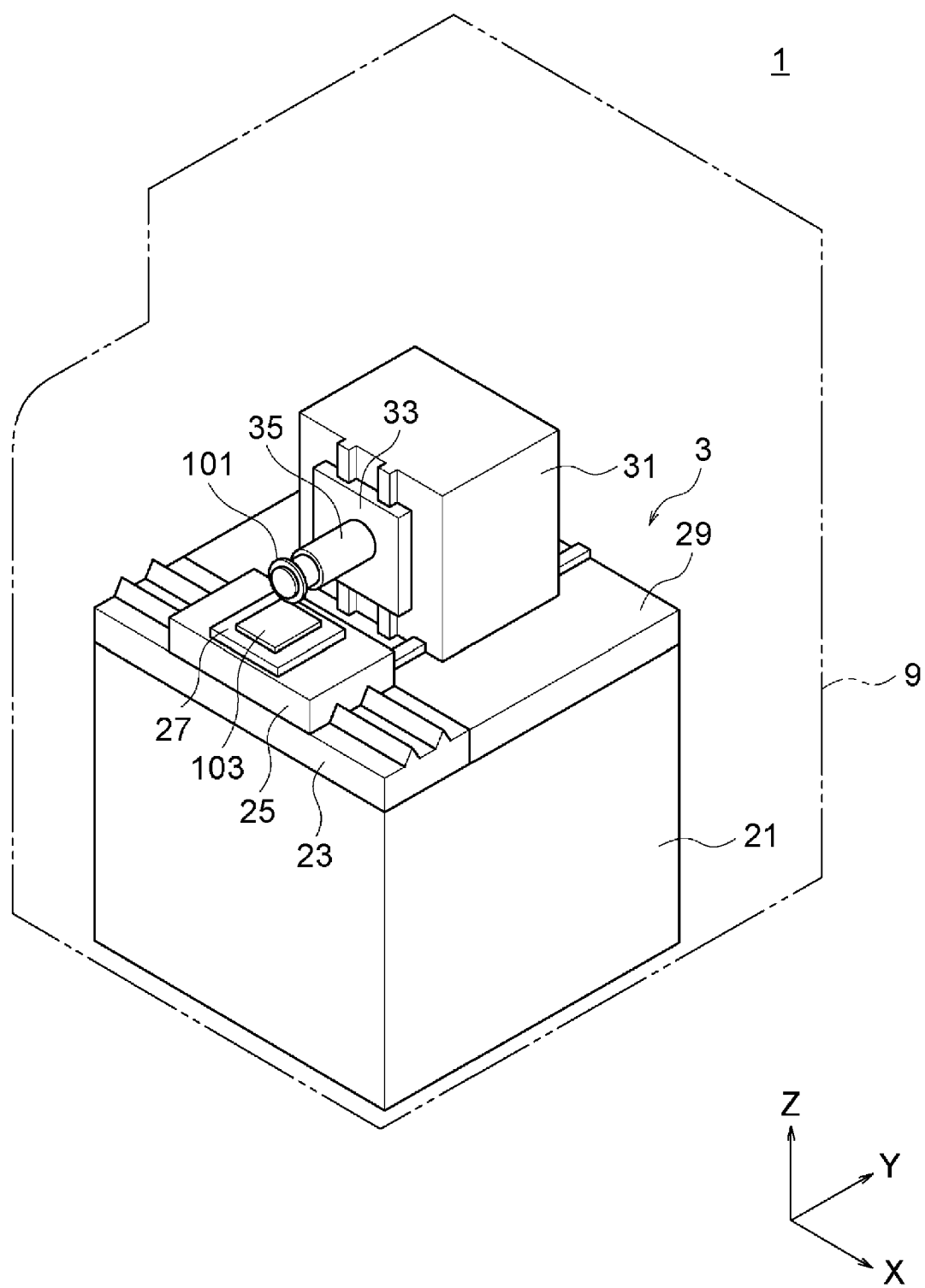
FIG. 2 is a schematic perspective view showing the configuration of part of an internal portion of the processing machine of FIG. 1.
Figure 3:
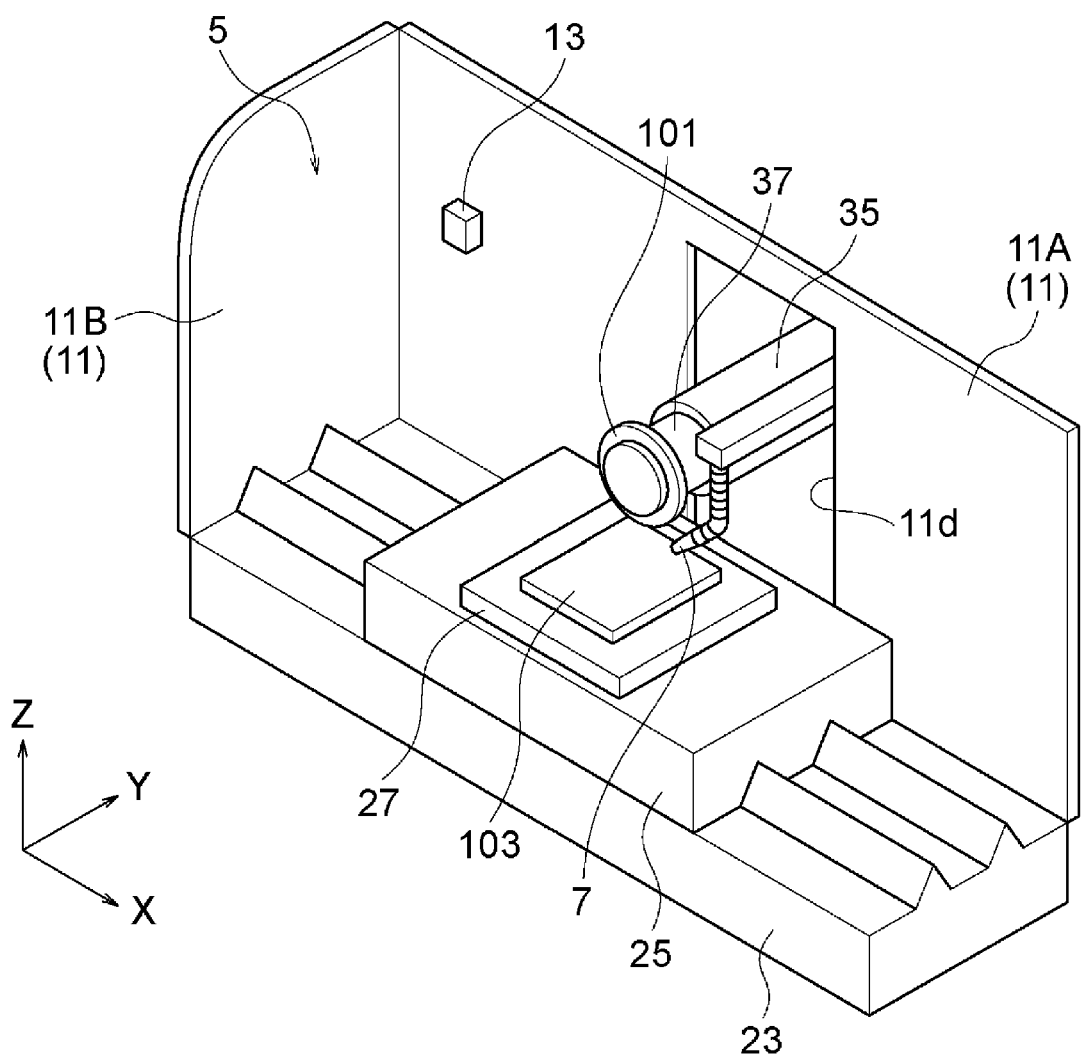
FIG. 3 is a schematic perspective view showing the interior of a processing chamber of the processing machine of FIG. 1 in an enlarged manner.

FIG. 1 is a schematic perspective view showing an appearance of a processing machine 1 according to an embodiment of the present disclosure. FIG. 2 is a schematic perspective view showing the configuration of part of an internal portion of the processing machine 1. FIG. 2 becomes a view showing part of the components in FIG. 1 in perspective. FIG. 3 is a schematic perspective view showing part (internal portion of a processing chamber 5 which will be explained later) in the processing machine 1 in FIG. 1 in an enlarged manner.

In the figures, for convenience, an orthogonal coordinate system XYZ is attached. The Z-direction is for example a direction parallel to the vertical direction, and the +Z side is for example upward. As will be understood from the explanation which will be given later, the orientations of the various members shown and the vertical direction may be in any relationships. The following explanation, however, for convenience, will sometimes be given predicated on the relationships between the orientations of the various members and the vertical direction shown in the figures.

The processing machine 1 processes (for example, cuts) a workpiece 103 by a tool 101. As shown in FIG. 3, the region where processing is carried out is supplied with a processing fluid (not shown, for example cutting fluid) from a nozzle 7. The tool 101 and workpiece 103 are supported and driven by a machine body 3 shown in FIG. 2. As will be understood from a comparison of FIG. 1 and FIG. 2, part of the machine body 3 is housed in the processing chamber 5. In turn, the tool 101, workpiece 103, and nozzle 7 (at least part of each) are housed in the processing chamber 5.

The inventor of the present application obtained the following discovery as a result of intensive studies. The temperature in the processing chamber 5 changes in accordance with the operation of the processing machine 1 even if the temperature of the atmosphere around the processing machine 1 (temperature in the room in which the processing machine 1 is set; below, for convenience, sometimes referred to as the "environmental temperature") is constant. From another viewpoint, the temperature in the processing chamber 5 does not track the environmental temperature. Specifically, for example, when the processing fluid is supplied from the nozzle 7, the temperature in the processing chamber 5 becomes lower than the environmental temperature. In particular, in a mode in which the tool 101 (or workpiece 103) is a rotating one, the effect of the processing fluid on lowering the temperature in the processing chamber 5 is large. The reason for this is believed to be that the processing fluid is scattered due to rotation of the tool 101 and is filled in the processing chamber 5 in a mist state and the heat in the processing chamber 5 is robbed when the filled mist like processing fluid vaporizes.

The inventor of the present application speculated that the temperature change in the processing chamber 5 described above (from another viewpoint, the difference from the environmental temperature) is a factor why the expected processing accuracy is not obtained even if controlling the environmental temperature and the temperature of the cutting fluid (further the temperature at a suitable position in the machine body 3) to be constant. Therefore, he performed an experiment making the temperature of the processing fluid rise in accordance with the difference (lowering amount) of the temperature in the processing chamber 5 relative to the environmental temperature so as to make the temperature in the processing chamber 5 track the environmental temperature. As a result, compared with a mode in which the temperature of the processing fluid is not controlled in this way, the processing accuracy was improved.

The above explanation was given by taking as an example a situation where the temperature in the processing chamber 5 becomes lower than the environmental temperature. However, for example, depending on the configuration of the processing machine 1 and contents of processing, the temperature in the processing chamber 5 may become higher than the environmental temperature due to the heat generated along with the processing. In this case, the temperature of the processing fluid may be reduced corresponding to the difference of the temperature in the processing chamber 5 relative to the environmental temperature. Due to this, the processing accuracy can be improved.

Considering the action explained above, the processing machine 1 is configured so as to control the temperature of the processing fluid to be supplied from the nozzle 7 in accordance with the difference between the temperature in the processing chamber 5 and the environmental temperature. Specifically, the processing machine 1 performs at least one of the following operations: an operation of raising the temperature of the processing fluid to be supplied to the nozzle 7 when the temperature in the processing chamber 5 is lower than the environmental temperature; and an operation of lowering the temperature of the processing fluid to be supplied to the nozzle 7 when the temperature in the processing chamber 5 is higher than the environmental temperature. Note that, the explanation of the present embodiment, for convenience, will sometimes be given predicated on the two operations being carried out.

(Details of Processing Machine)

As already explained, the processing machine 1 for example has the machine body 3, processing chamber 5, and nozzle 7. The processing machine 1, in addition to the above components, has for example the following components: a housing 9 which houses the machine body 3 (FIG. 1 and FIG. 2); partitions 11A and 11B (FIG. 1 and FIG. 3; below, sometimes the partitions 11A and 11B will not differentiated and will be simply referred to as the partitions 11) which partition the interior of the housing 9 and configure the processing chamber 5 together with the housing 9; an internal temperature sensor 13 (FIG. 1 and FIG. 3) which detects the temperature in the processing chamber 5; an external temperature sensor 15 (FIG. 1) which detects the environmental temperature; a supply device 17 (FIG. 4 which will be explained later) which supplies the processing fluid to the nozzle 7; and a temperature adjustment part 19 (FIG. 4 which will be explained later) which controls the temperature of the processing fluid to be supplied from the supply device 17 to the nozzle 7 based on the detection temperatures by the above temperature sensors (13 and 15).

Below, first, the components etc. of the processing machine 1 will be explained schematically in the following listed order: the tool 101, workpiece 103, processing fluid, machine body 3, housing 9, partitions 11, processing chamber 5, nozzle 7, internal temperature sensor 13, external temperature sensor 15, supply device 17, and temperature adjustment part 19. After that, the manufacturing method of the processed object according to the embodiment, a summary of the embodiment, and one example of the workpiece 103 (processed object) after processing will be explained.

(Tool)

The tool 101 may be various tools used for various processing. For example, the tool 101 may be made a cutting tool performing cutting, a grinding tool performing grinding, or a polishing tool performing polishing. The cutting tool may be for example a milling tool (rotating tool) which rotates by itself and cuts the workpiece 103 or may be a turning tool which cuts the rotating workpiece 103. As the milling tool, for example, there can be mentioned a milling cutter, drill, and reamer. The grinding tool or polishing tool may be one using fixed abrasive grains fixed onto the tool or may be one using free abrasive grains contained in a slurry.

In FIG. 1 to FIG. 3, a milling tool is illustrated as the tool 101. In more detail, the tool 101 in the example shown is a cutting blade having a cutting edge on its outer periphery. The cutting blade is schematically plate shaped (disk shaped or ring shaped) having a circular outer edge. The cutting blade is utilized for formation of a groove on the workpiece 103 and/or cutting (division) of the workpiece 103 by rotating about its axis (in the example shown, about the rotation axis parallel to the Y-direction). The processing machine 1 may have one cutting blade attached (example shown) or may have a plurality of cutting blades which are separated from each other in a direction parallel to the rotation axis attached to it. Note that, the following explanation, as in the example shown, is sometimes given predicated on a mode where one cutting blade is attached.

(Workpiece)

As will be understood from the above explanation that there may be various types of processing carried out by the tool 101, the workpiece 103 may also be various ones. For example, the material of the workpiece 103 may be various ones. It may be metal, ceramic, resin, wood, chemical wood, or a composite material (for example carbon fiber reinforced plastic). The workpiece 103 before processing and/or after processing may be any shape and dimensions. Also the dimensions demanded from the workpiece 103 after processing may be any accuracy. For example, when explaining an example of a case where relatively high accuracy is demanded, the accuracy (allowance) may be made 10 μm or less, 1 μm or less, or 100 nm or less.

In FIG. 1 to FIG. 3, as the workpiece 103, a plate-shaped one (substrate) is illustrated. The plate-shaped workpiece 103 before processing may be any shape. For example, it is rectangular shape (example shown) or circular shape. In the mode already explained in which the tool 101 is a disk-shaped cutting blade having a cutting edge on its outer periphery, the cutting blade for example contributes to formation of a groove which extends in a direction (X-direction) perpendicular to the rotation axis of the tool 101 in the upper surface (surface on the +Z side) of the plate-shaped workpiece 103 or to division of the workpiece 103 in the Y-direction.

(Processing Fluid)

As will be understood from the already given explanation of the tool 101, the processing fluid (not shown) may be various ones utilized for various processing. For example, in a mode in which the processing is cutting, the processing fluid may be made a cutting fluid (in another expression, cutting oil). The principal ingredient of the cutting fluid may be oil or may be water. The cutting fluid for example contributes to lubrication, cooling, rustproofing, etc. Further, the processing fluid may be made for example a grinding fluid for grinding or polishing fluid for polishing. The grinding fluid or polishing fluid (slurry) may also contain free abrasive grains. Further, in any processing, the processing fluid may be made simply water as well.

(Machine Body)

The machine body 3 supports and drives the tool 101 and workpiece 103. That is, the machine body 3 is responsible for the main portions of the processing. The configuration of the machine body 3 may be made various modes. For example, it may be a known configuration.

For example, regarding the machine performing the processing, sometimes a machine tool and an industrial robot will be differentiated from each other (the boundary between the two is not always clear). In a case of such differentiation, the machine body 3 may be classified as either. Note that, in the explanation of the present embodiment, a mode where the machine body is generally classified as a machine tool will be taken as an example.

Further, for example, as will be understood from the already given explanation of the tool 101, the processing aimed at by the processing machine 1 may be cutting, grinding, and/or polishing or other various ones. Further, the machine body 3 performing cutting etc. may be one making the tool 101 rotate or may be one making the workpiece 103 rotate. The machine body 3 (processing machine 1) making the tool 101 rotate may be for example a milling machine, drilling machine, boring machine, and machining center. The machine body 3 may be or may not be a numerical control (NC) machine tool or may be or may not be a multi-tasking machine tool. The machine body 3 may be one driving one tool 101 (example shown) or may be a multi-axial or multihead type which simultaneously drives a plurality of tools 101.

The machine body 3, for example, moves the tool 101 and the workpiece 103 relative to each other on each of an X-axis, Y-axis, and Z-axis which are perpendicular to each other. The machine body 3 may be one able to make the tool 101 and the workpiece 103 relatively move on another axis as well in addition to the above three axes. For example, the machine body 3 may be one able to rotate a tool about at least one axis which is parallel to any of the above three axes (for example a 5-axis machining center) as well. Also, the orientation of the spindle (explained later) and the vertical direction may be in any relationship. The relative movements of the tool 101 and the workpiece 103 on each axis may be realized by movement of the tool 101 or may be realized by movement of the workpiece 103 as will be understood from a known machine tool.

In FIG. 2, as the machine body 3, a slicer able to perform cutting by making a disk-shaped tool 101 having a cutting edge on its outer periphery rotate is illustrated.

Specifically, for example, the machine body 3 illustrated in FIG. 2 has the following components as the components supporting the workpiece 103: a base 21 set on a floor surface in a factory or the like; an X-axis bed 23 fixed on the base 21; a table 25 which is supported upon the X-axis bed 23 and is able to move in the X-direction (horizontal direction); and a chuck 27 which is fixed on the table 25 and detachably holds the workpiece 103. Although not particularly shown, the machine body 3 may be configured so as to able to make the table 25 rotate about an axis parallel to the Z-axis as well.

Further, for example, the machine body 3 illustrated in FIG. 2 has the following components as the components supporting and driving the tool 101: the base 21; a Y-axis bed 29 which is fixed on the base 21; a Y-axis movement part 31 which is supported upon the Y-axis bed 29 and is able to move in the Y-direction (horizontal direction); a Z-axis movement part 33 which is supported upon the Y-axis movement part 31 and is able to move in the Z-direction (vertical direction); a spindle head 35 fixed to the Z-axis movement part 33 (for convenience, it does not include a spindle 37 which will be explained later); and a spindle 37 (notation is shown in FIG. 3) which is supported by the spindle head 35 so as to be able to rotate about a rotation axis parallel to the Y-direction and detachably holds the tool 101.

A driving force from a not shown drive source (for example electric motor) is transmitted to the table 25 to move the table 25 in the X-direction, whereby the workpiece 103 supported upon the table 25 moves in the X-direction relative to the tool 101. A driving force from a not shown drive source (for example electric motor) is transmitted to the Y-axis movement part 31 to move the Y-axis movement part 31 in the Y-direction, whereby the tool 101 supported upon the Y-axis movement part 31 moves in the Y-direction relative to the workpiece 103. A driving force from a not shown drive source (for example electric motor) is transmitted to the Z-axis movement part 33 to move the Z-axis movement part 33 in the Z-direction, whereby the tool 101 supported upon the Z-axis movement part 33 moves in the Z-direction relative to the workpiece 103. A driving force from a not shown drive source (for example electric motor) is transmitted to the spindle 37 to make the spindle 37 rotate about the axis, whereby the tool 101 held by the spindle 37 is rotated about the axis.

FIG. 1 to FIG. 3 are schematic views. The shapes of the members (21, 23, 25, 27, 29, 31, 33, 35, and 37) shown in the views are just schematic ones. The shapes of the members in actuality may be very different from the shown shapes. Further, the members may be any materials. Further, also a guide (notation is omitted) which guides the movement part (25, 31, or 33) moving parallel with respect to the support part (23, 29, or 31) is only schematically shown. It may be different from the shown shape as well.

The guide which guides the movement part (25, 31, or 33) moving parallel with respect to the support part (23, 29, or 31) may be made a suitable one. For example, the guide may be a sliding guide by which the support part and the movement part slide, may be a rolling guide in which a roller rolls between the support part and the movement part, may be a static pressure guide interposing air or oil between the support part and the movement part, or may be a combination of two or more of the same. In the same way, the bearing of the spindle 37 may be made a sliding bearing, rolling bearing, static pressure bearing, or combination of two or more of the same.

The drive source relating to the parallel movement is for example an electric motor. This electric motor may be a rotary type or may be a linear motor. The rotational motion of the rotary electric motor may be converted to linear motion by a suitable mechanism such as a screw mechanism (for example ball screw mechanism). Further, the drive source relating to the parallel movement may be made a liquid pressure type (hydraulic type) or air pressure type. In the same way, the drive source relating to the rotation of the spindle 37 is for example a rotary electric motor. However, the drive source relating to the rotation of the spindle 37 may be made a liquid pressure type (hydraulic type) or air pressure type as well.

The chuck 27 is for example configured by a vacuum chuck or electrostatic chuck and is attached to the table 25 by a machine vise (not shown) or another suitable device. Note that, the chuck 27 may be configured integrally and inseparably with respect to the table 25 different from the above explanation. Further, the chuck 27 need not be provided: the workpiece 103 may be fixed to the table 25 by a suitable jig (for example machine vise) different from the chuck 27.

The spindle 37 may hold the tool 101 by its own mechanism (for example, a clamp mechanism) or the tool 101 may be attached by device including a screw etc. The cutting blade (tool 101), for example, although not particularly shown, may be fixed to the spindle 37 by a member having a shaft portion inserted through a hole formed at the center of the cutting blade, a member which is superposed on the cutting blade in the axial direction of the spindle 37, and a screw which is inserted through these members and is screwed with the spindle 37. In such a mode, the cutting blade may be grasped as the tool 101, or the cutting blade and the device for attaching the cutting blade to the spindle 37 together may be grasped as the tool 101.

Note that, as already explained, the processing machine 1 may be one making the workpiece 103 rotate. In this case, for example, the spindle rotating about the axis holds the workpiece 103, and a tool post holds a tool bit as the tool 101. When considering also a mode different from the example shown, in the machine body 3, the portion holding the workpiece 103 (table 25 in the example shown) may be conceptualized as the workpiece holding part. Further, in the machine body 3, the portion (spindle 37 in the example shown) which holds the tool 101 may be conceptualized as the tool holding part. In the explanation of the present embodiment, sometimes use will be made of terms such as the "workpiece holding part" and "tool holding part".

The machine body 3 operates by commands from a control device 39 (see FIG. 4 which will be explained later). More specifically, for example, the processing machine 1 is an NC machine tool, and the control device 39 controls the rotation of the spindle 37 and the relative movements of the table 25 and the spindle 37 according to an NC program stored in advance.

(Housing, Partitions, and Processing Chamber)

The configurations of housing 9, partitions 11 (11A and 11B), and processing chamber 5 may be various ones. For example, they may be the same as known ones. For example, the housing 9 and partitions 11 may be made of any materials. Parts or all of the same may be made of a metal, resin, ceramic, or glass. Also, the housing 9, partitions 11, and processing chamber 5 may be made any shapes and dimensions. The housing 9 and partitions 11 are only examples of the members configuring the processing chamber 5. These members do not always have to be provided. For example, although not particularly shown, in place of the housing 9, the processing chamber 5 may also be configured by provision of a cover partially covering the machine body 3.

Whether the processing machine 1 has the processing chamber 5 may be reasonably judged. For example, it may be considered that the processing chamber 5 is configured if the space in which the tool 101 and the workpiece 103 are present is isolated from the outside by suitable members (9, 11, 23, etc.) from each of the two sides of each axis (X-axis, Y-axis, or Z-axis) in the 3-axial directions perpendicular to each other. Further, it may be considered that the processing chamber 5 is configured when at each of the two sides of each of the axes, 60% or more, 80% or more, or the entire area in the area formed by projecting the processing chamber 5 onto each axis is isolated from the outside (the cross-sectional area opening the space to the outside is less than 40%, less than 20%, or 0). Further, it may be considered that the processing chamber 5 is configured when the sum of cross-sectional areas of gaps formed in various directions connecting the space and the outside of the space is 40% or less, 20% or less, or 10% or less of the area of the surface of the space.

As will be understood from the above explanation, the processing chamber 5 may have any degree of sealability. Further, the processing chamber 5 may be filled with air or may be filled by a gas other than air (for example nitrogen or another inert gas). The pressure in the processing chamber 5 may be equal to the atmospheric pressure, may be lower than the atmospheric pressure, or may be higher than the atmospheric pressure.

In the example shown, as shown in FIG. 1, the housing 9 has a housing body 41 and a transparent panel 43 arranged at the window of the housing body 41. The housing body 41 is for example configured by a combination of a metal frame and metal plates and surrounds the machine body 3 and control device 39 etc. from the upper part and sides (four sides when viewed on a plane) to house the same. Although not particularly shown, from the housing body 41, an operation part (for example touch panel and/or mechanical switches) which receives operations by the user and a display (for example one used also as the touch panel) which displays an image may be exposed. The transparent panel 43 is for example configured by a transparent resin or glass. Although not particularly shown, the transparent panel 43 may be provided so that it can be opened and closed. The partitions 11 are for example configured by metal plates and are fixed with respect to the machine body 3 and/or housing body 41.

The housing 9 substantially isolates the space above the X-axis bed 23 from the outside of the housing 9 at the −Y side, +X side, and +Z side of the space. The partition 11A isolates the space above the X-axis bed 23 from the other portions in the machine body 3 (other spaces in the housing 9) at the +Y side of the space. The partition 11B isolates the space above the X-axis bed 23 from the other portions in the machine body 3 (other spaces in the housing 9) at the −X side of the space. Due to this, the processing chamber 5 surrounded by the upper surface of the X-axis bed 23, housing 9, and partitions 11A and 11B is configured.

In the machine body 3, for example, at least the portion of the table 25 on its upper surface side (and the chuck 27) is housed in the processing chamber 5. Although not particularly shown, the upper surface of the X-axis bed 23 may be covered by a telescopic cover connected to the table 25. In this case, the upper surface of the telescopic cover may be grasped as the bottom surface of the processing chamber 5 as well. Further, in the spindle 37, at least the front end side portion is housed in the processing chamber 5 through an opening 11d (notation is shown in FIG. 3) formed in the partition 11A. Although not particularly shown, a cover covering the spindle head 35 may be provided, the configuration similar to the telescopic cover closing the opening 11d may be provided.

As described above, at least part of the workpiece holding part (table 25 or chuck 27 in the example shown) and at least part of the tool holding part (spindle 37 in the example shown) are housed in the processing chamber 5. In turn, the workpiece 103 and the tool 101 are housed in the processing chamber 5. From another viewpoint, in the machine body 3, parts other than the workpiece holding part and tool holding part are not housed in the processing chamber 5 and are isolated from the tool 101 and workpiece 103.

(Nozzle)

The nozzle 7 supplies the processing fluid to the region where the workpiece 103 is processed by the tool 101 (below, it will be sometimes referred to as the "processing region"). The processing region, in other words, is a region in the workpiece 103 where the processing is carried out by the tool 101. For example, in a mode where the tool 101 performs cutting, the processing region is the position at which the cutting edge abuts against the workpiece 103 and its adjacent region. In such a mode where that the tool 101 performs grinding and polishing, for example, the processing region is the contact position of the tool 101 and the workpiece 103 and its adjacent region or is the contact region. The contact may be an indirect one through free abrasive grains as well.

The processing fluid may be supplied to the processing region in various ways. For example, the nozzle 7 may discharge hydraulic fluid toward the processing region or may discharge hydraulic fluid toward the tool 101 or workpiece 103 to make the hydraulic fluid reaching the tool 101 or workpiece 103 flow to the processing region. The nozzle 7 may eject the processing fluid or may make the processing fluid flow out at a flow rate in a manner not like ejection. The nozzle 7 may make the processing fluid flow out (for example eject it) as one flow having a suitable cross-section or may make the processing fluid flow out (for example eject it) in a shower manner or may eject the processing fluid in a mist state.

The configuration of the nozzle 7 may be a various one. For example, it may be the same as known one as well. For example, the nozzle 7 may be made detachable with respect to the machine body 3. In this case, in the same way as the tool 101 and workpiece 103, the nozzle 7 may be grasped as an element different from the processing machine 1. The nozzle 7 may be able to move during the processing or may be arranged at a fixed position. The nozzle 7 may be positioned with respect to a predetermined element (for example spindle 37) manually or by a robot.

In the example shown in FIG. 3, the nozzle 7 is positioned at the front end of bellows (notation is omitted) able to be maintained in shape. The end part of the bellows on the side opposite to the nozzle 7 is connected to a block (notation is omitted) having a flow passage. The block is fixed to the spindle head 35 by a suitable device. Accordingly, the nozzle 7 is able to relatively move together with the tool 101 with respect to the workpiece 103 (excluding rotation about the axis of the tool 101). Further, the specific position and orientation are determined by changing the shape of the bellows manually.

(Internal Temperature Sensor and External Temperature Sensor)

The internal temperature sensor 13, for example, is exposed at the processing chamber 5 in part (portion detecting the temperature) or entirety (for example part or all is housed in the processing chamber 5) and detects the temperature of the atmosphere in the processing chamber 5. The specific position etc. of the internal temperature sensor 13 may be suitably set. For example, the internal temperature sensor 13, when equally dividing the processing chamber 5 into three in the X-direction, Y-direction, or Z-direction, may be positioned in a central region or may be positioned in the other regions. The internal temperature sensor 13 may be fixed to an immovable element or may be fixed to a moving element. In the example shown, the internal temperature sensor 13 is fixed to the partition 11A. Unlike the example shown, the internal temperature sensor 13 may be for example fixed to the housing 9, partition 11B, spindle head 35, or table 25 as well.

The external temperature sensor 15 detects the temperature of the atmosphere around the processing machine 1. The external temperature sensor 15 may be set at any position so long as it can substantially detect the temperature of the atmosphere around the processing machine 1. For example, as in the example shown, in a mode where the processing machine 1 has the housing 9, the external temperature sensor 15 may be provided so that part (portion detecting the temperature) or all is exposed to the outside of the housing 9. In a case where the temperature of the atmosphere in the predetermined space in the housing 9 other than the processing chamber 5 and the temperature of the atmosphere outside the housing 9 are equal, the external temperature sensor 15 may be provided so as to measure the temperature of the atmosphere in the above predetermined space. In a mode where the housing 9 is not provided, the external temperature sensor 15, for example, may be positioned in part or entirety outside the machine body 3. In a mode where the processing machine 1 is arranged in a predetermined room (for example thermostatic chamber and/or clean room), the external temperature sensor 15 may be arranged at position separated from the machine body 3 and housing 9 etc. so as to measure the temperature of the atmosphere inside the room.

The configurations of the temperature sensors (13 and 15) may be various ones. For example, they may be the same as various ones known as temperature sensors. For example, the temperature sensor may be a thermistor, temperature measuring resistor, thermocouple, or radiant thermometer. The sensor referred to here may be just a transducer or may be one including a circuit performing processing such as amplification in addition to a transducer. The explanation in the present paragraph may be cited for the liquid temperature sensor 47 (FIG. 4) which will be explained later.

In the example shown, one internal temperature sensor 13 and one external temperature sensor 15 are shown. Unlike the example shown, a plurality of internal temperature sensors 13 may be provided, and the representative value (for example mean value) of the measured temperatures may be utilized. The same is true for the external temperature sensor 15. The measured temperature of the temperature sensor (13 or 15) may be utilized as it is or may be utilized after predetermined correction. For example, in a mode where the internal temperature sensor 13 is provided in the end part region of the processing chamber 5 so that cutting chips do not deposit on it, if the temperature in the end part region is not always suitable as a temperature representative of the temperature in the processing chamber 5, a correction coefficient may be multiplied with it or a correction constant may be added/subtracted. In the explanation of the present disclosure, the raw measured temperature and the measured temperature after correction will not be differentiated and will be referred to as the "measured temperatures".

(Supply Device of Processing Fluid)

Figure 4:
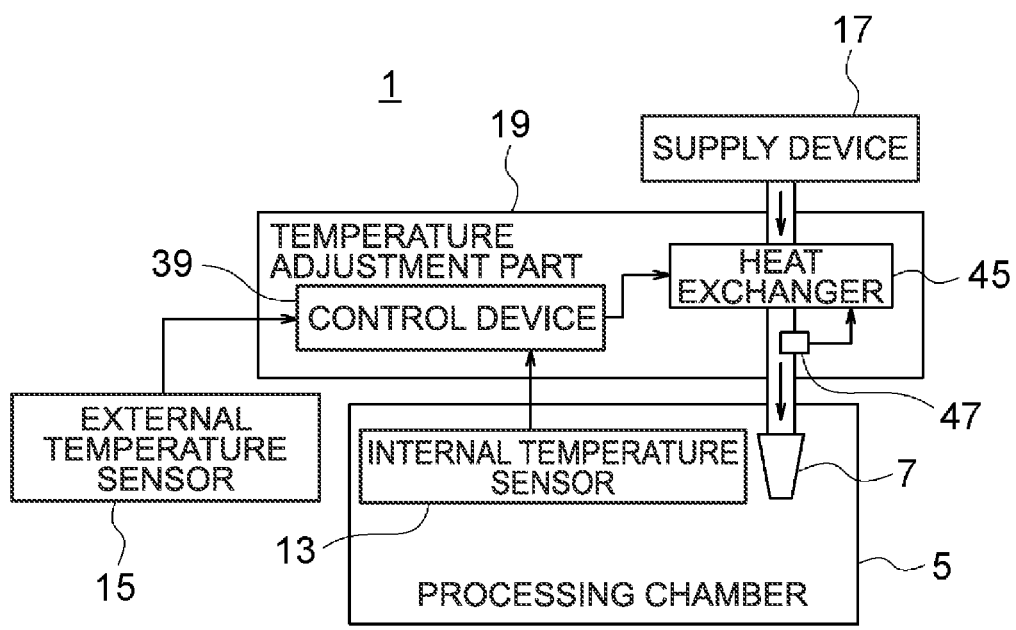
FIG. 4 is a block diagram schematically showing the configuration relating to supply of a cutting fluid in the processing machine of FIG. 1.

FIG. 4 is a block diagram schematically showing the configuration relating to the supply of the cutting fluid in the processing machine 1.

The supply device 17 supplying the processing fluid may be suitably configured in accordance with the type etc. of the processing fluid. For example, in a mode where the processing fluid is a cutting fluid, grinding fluid, or polishing fluid, the supply device 17 may be the same configuration as the device which supplies the processing fluid in a usual machine tool or may be a configuration to which this has been applied. Further, in a mode where the processing fluid is water, the supply device 17 may be configured having a valve which is supplied with water from the factory facilities and permits and prohibits the supply of the water to the nozzle 7.

The supply device 17 which supplies the cutting fluid, grinding fluid, or polishing fluid or a processing fluid similar to them may have, for example, although not particularly shown, a tank storing the processing fluid and a pump which sends out the processing fluid from the tank. Further, the supply device 17 may have a valve which controls the flow of the processing fluid at a suitable position (for example a position between the pump and the outflow port of the supply device 17). Further, the supply device 17 may control any supply of the processing fluid and the flow rate of the processing fluid and/or pressure of the processing fluid by the pump and/or valve.

The supply device 17 may further have or not have a tank storing the stock solution of the processing fluid and a mixing part which dilutes the stock solution. Further, the supply device 17 may have or not have a configuration for collecting and filtering the processing fluid which was supplied to the processing region. From another viewpoint, the processing fluid may be reused or may be disposed of.

The supply device 17, for example, does not perform the operation of adjusting the temperature of the processing fluid. Accordingly, the processing fluid flows out from the supply device 17 at the temperature influenced by the temperature of the atmosphere around the supply device 17 and heat generation along with drive of the supply device 17 and the like. However, the supply device 17 may be configured for adjusting the temperature of the processing fluid as well. For example, the supply device 17 may have a cooling device for cooling the collected high temperature processing fluid to a predetermined target temperature or a temperature not more than a predetermined upper limit temperature (for example 40° or less). As opposed to this, it may have a heater which heats low temperature processing fluid up to a predetermined target temperature or a temperature not less than a predetermined lower limit temperature.

In the explanation of the present embodiment, the supply device 17 is grasped as part of the processing machine 1. In this case, the supply device 17, in appearance, may be provided in a mode where it can be grasped as part of the processing machine 1 or may be provided in a mode where it is not grasped as that. For example, part or all of the supply device 17 may be housed in the housing 9 or may be positioned outside the housing 9. Part or all of the supply device 17 may be arranged in the base 21 or on the base 21 in the machine body 3.

(Temperature Adjustment Part)

The temperature adjustment part 19 adjusts the temperature of the processing fluid which is supplied to the nozzle 7. In the example in FIG. 4, the temperature adjustment part 19 is interposed between the supply device 17 and the nozzle 7, adjusts the temperature of the processing fluid supplied from the supply device 17, and supplies the processing fluid after adjustment of the temperature to the nozzle 7. Unlike the example shown, for example, the temperature adjustment part 19 may adjust the temperature in the tank storing the processing fluid of the supply device 17 or may adjust the temperature of the processing fluid in the flow passage provided in the supply device 17.

As will be understood from the above explanation, the temperature adjustment part 19, in an actual structure, may be provided as a completely separate element from the supply device 17 or at least part thereof may be configured integrally and inseparably with respect to the supply device 17. The latter configuration includes a mode where the temperature adjustment part provided in the supply device 17 is utilized as the temperature adjustment part 19 here. Note that, in the explanation of the present disclosure, in all configurations, the temperature adjustment part 19 and the supply device 17 are grasped as different elements. Further, for convenience, sometimes they are expressed predicated on the shown configuration (configuration where the temperature adjustment part 19 is interposed between the supply device 17 and the nozzle 7).

The temperature adjustment part 19, for example, has a heat exchanger 45 which exchanges heat with the processing fluid and a control device 39 which controls the heat exchanger 45. The temperature adjustment part 19 may further have a liquid temperature sensor 47 for the processing fluid after adjustment of the temperature by the temperature adjustment part 19 as well. Further, although not particularly shown, the temperature adjustment part 19 may have a fluid temperature sensor which adjusts the temperature of the processing fluid before adjustment of the temperature.

The control device 39 is a conceptualization of a control device for the entire processing machine 1. As already explained, it also controls the rotation of the tool 101 and the relative movement of the tool 101 with respect to the workpiece 103 and the like. FIG. 4 depicts the control device 39 as such, as part of the temperature adjustment unit 19. The control device 39 may be consolidated into one position in terms of hardware or may be provided at a plurality of positions dispersed. When explaining the latter example, a control device performing control of the machine body 3, a control device controlling the temperature adjustment part 19, and a control device synchronizing them may be separately provided in terms of hardware as well.

The control device 39 may be for example configured by a computer. The computer, for example, although not particularly shown, is configured including a CPU (central processing unit), ROM (read only memory), RAM (random access memory), and external storage device. The CPU runs a program stored in the ROM and/or external storage device to thereby construct various functional parts performing control etc. Note that, the control device 39 may include a logical circuit performing only fixed processing as well.

The heat exchanger 45 is able to perform at least one of heating or cooling of the processing fluid. The temperature of the processing fluid rises due to heating by the heat exchanger 45 and/or the temperature of the processing fluid falls due to cooling by the heat exchanger 45. However, different from the above explanation, the temperature adjustment part 19 may raise the temperature of the processing fluid by easing the degree of cooling which has been already carried out or may lower the temperature by easing the degree of heating which has been already carried out. For example, as already explained, the supply device 17 may have a cooling device which cools the collected high temperature processing fluid to a predetermined temperature. The temperature of the processing fluid may be raised by utilizing this cooling device as the heat exchanger 45 and easing the degree of cooling.

As the heat exchanger 45 able to perform only heating, for example, there can be mentioned a heater having a heating wire or heat pump configured for only heating. As the heat exchanger 45 able to perform only cooling, for example, there can be mentioned a fan for air-cooling and a heat pump configured dedicated to cooling. As the heat exchanger 45 able to perform both heating and cooling, for example, there can be mentioned a heat pump configured so as to be able to perform both heating and cooling. As a representative example of the heat pump, there can be mentioned a vapor compression type one which performs compression, heat-radiation, expansion, and heat-absorption in order with respect to the heating medium. Two or more types of means may be combined such as a combination of a heater and a heat pump.

The control device 39 controls the heat exchanger 45 based on the difference between the measured temperature of the internal temperature sensor 13 and the measured temperature of the external temperature sensor 15 so that the former temperature becomes closer to the latter temperature. The mode of control at this time may be made various ones. For example, the control method may be made proportional (P) control, proportional differential (PD) control, proportional integral (PI) control, PID control or fuzzy control, or another suitable one. Further, the value of the proportional gain etc. may also be suitably set.

As one example, for example, when the measured temperature of the internal temperature sensor 13 is lower than the measured temperature of the external temperature sensor 15, the control device 39 may control the heat exchanger 45 so that the temperature of the processing fluid becomes higher than the temperature at present by exactly a difference of the two temperatures. This control may be carried out so that the measured temperature of the liquid temperature sensor 47 rises by exactly the above difference or may be carried out based on the relationships between the rising temperature and the amount of operation of the heat exchanger 45 which are stored in advance. A cycle of setting the target value of the rising temperature (in other words, amount of the temperature change) as described above may be for example suitably set in accordance with the magnitude of the temperature difference which may occur, performance of the heat exchanger 45, and the like so that the target value is achieved in the cycle. Otherwise, it may be made shorter (or longer) than such a duration.

Similar control may be carried out even at the time when the measured temperature of the internal temperature sensor 13 is higher than the measured temperature of the external temperature sensor 15. Further, different from the above explanation, the heat exchanger 45 may be controlled simply (without considering the temperature of the processing fluid)

by an amount of operation obtained by multiplying the difference of the two temperatures by a gain as well.

(Manufacturing Method)

The above explanation was given centered about the configuration and operation of the processing machine 1. From the above explanation, the concept of the manufacturing method for processing the workpiece 103 so as to manufacture the processed object can be derived.

Figure 5:
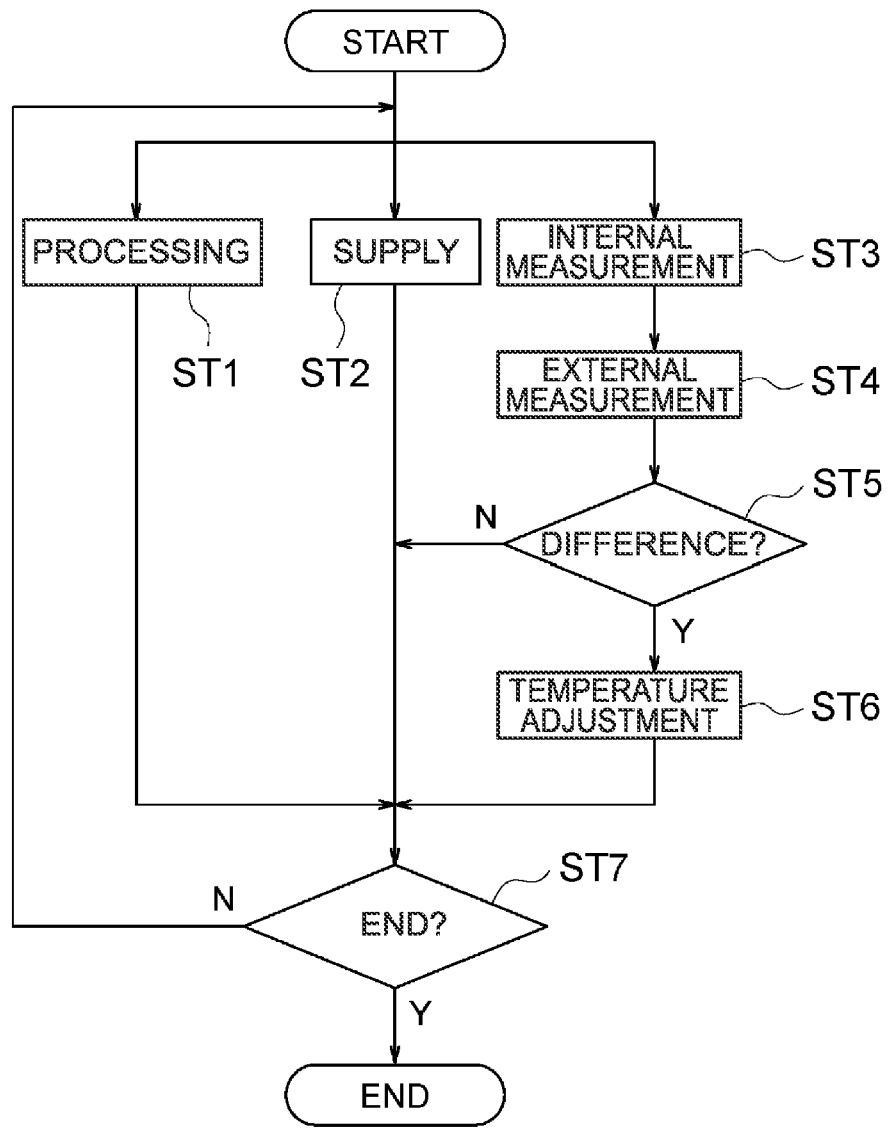
FIG. 5 is a flow chart showing an example of the procedure of a manufacturing method according to an embodiment of the present disclosure.

FIG. 5 is a flow chart showing an example of the procedure of the manufacturing method according to an embodiment of the present disclosure. This flow chart may be grasped as a flow chart showing an example of the procedure of processing executed by the control device 39 as well. However, this flow chart is just one for conceptually showing the steps included in the manufacturing method and is not one accurately showing the procedure of the processing executed by the control device 39.

The manufacturing method according to the embodiment has a processing step (step ST1) of processing the workpiece 103 by the tool 101 and a supply step (step ST2) of supplying the processing fluid from the nozzle 7 to the processing region. These two steps are for example carried out in parallel with each other.

Further, the manufacturing method according to the embodiment has an internal measurement step (step ST3) of detecting the temperature inside the processing chamber 5 and an external measurement step (step ST4) of detecting the environmental temperature. These two steps for example may be carried out in parallel with the processing step (step ST1) and supply step (step ST2). In FIG. 5, for convenience, the internal measurement step is carried out before the external measurement step. However, the two steps may be carried out in an inverse order to the illustration or may be carried out in parallel with each other.

Further, when there is a difference between the measured temperature in the internal measurement step and the measured temperature in the external measurement step (positive judgment in step ST5), the manufacturing method according to the embodiment performs the temperature adjustment step (step ST6) of raising or lowering the temperature of the processing fluid. Note that, like in the illustrated example, the control device 39 may judge (step ST6) whether temperature adjustment is required. It may also continuously perform the control for the temperature adjustment based on the difference of the temperatures without performing such judgment. That is, the operation of raising or lowering the temperature may be carried out by the heat exchanger 45 only at the time when there is a difference of the temperatures as a result.

After that, when the conditions for ending the processing are satisfied (positive judgment at step ST7), the various steps explained above are ended. Conversely, until the conditions for ending the processing are satisfied, the above various steps are continued or repeatedly executed.

In the manufacturing method according to the present embodiment, part of the steps may be carried out manually. For example, an operator may operate the heat exchanger 45 based on the temperature in the processing chamber 5 and the environmental temperature as well. In this case, in place of the internal temperature sensor 13 and external temperature sensor 15, use may be also made of a thermometer which changes the position of the needle or the position of the liquid relative to the scale in accordance with the temperature (in other words, one which does not output an electrical signal in accordance with the temperature).

Summary of Embodiment

As explained above, the processing machine 1 according to the present embodiment is one wherein the nozzle 7 is arranged which supplies the processing fluid to the region where the workpiece 103 is processed by the tool 101. The processing machine 1 may have the machine body 3, processing chamber 5, internal temperature sensor 13, external temperature sensor 15, and temperature adjustment part 19. The machine body 3 drives at least one of the workpiece 103 and the tool 101 to perform processing of the workpiece 103 by the tool 101. The processing chamber 5 houses the workpiece 103, tool 101, and nozzle 7 while isolating the workpiece 103, tool 101, and nozzle 7 from at least part of the machine body 3 (for example, the base 21, Y-axis bed 29, Y-axis movement part 31, and Z-axis movement part 33). The internal temperature sensor 13 measures the temperature of the atmosphere in the processing chamber 5. The external temperature sensor 15 measures the temperature of the atmosphere around the processing machine 1. The temperature adjustment part 19 raises the temperature of the processing fluid which is supplied to the nozzle 7 when the measured temperature of the internal temperature sensor 13 is lower than the measured temperature of the external temperature sensor 15, and/or the temperature adjustment part 19 lowers the temperature of the processing fluid which is supplied to the nozzle 7 when the measured temperature of the internal temperature sensor 13 is higher than the measured temperature of the external temperature sensor 15.

From another viewpoint, the manufacturing method of the processed object according to the present embodiment has the processing step (ST1), supply step (ST2), internal measurement step (ST3), external measurement step (ST4), and temperature adjustment step (ST6). The processing step processes the workpiece 103 to the processed object by the tool 101 by using the processing machine 1. The processing machine 1 has the machine body 3 and processing chamber 5. The machine body 3 drives at least one of the workpiece 103 and the tool 101. The processing chamber 5 houses the workpiece 103, tool 101, and nozzle 7 while isolating the workpiece 103, tool 101, and nozzle 7 from at least part of the machine body 3. The supply step supplies the processing fluid from the nozzle 7 to the region where the workpiece 103 is processed by the tool 101 in parallel with the processing step. The internal measurement step measures the temperature of the atmosphere in the processing chamber 5. The external measurement step measures the temperature of the atmosphere around the processing machine 1. The temperature adjustment step raises the temperature of the processing fluid which is supplied to the nozzle 7 when the measured temperature in the internal measurement step is lower than the measured temperature in the external measurement step, and/or the temperature adjustment step lowers the temperature of the processing fluid which is supplied to the nozzle 7 when the measured temperature of the internal temperature sensor is higher than the measured temperature of the external temperature sensor.

According to the configuration or procedure described above, as already explained, the processing accuracy can be improved by making the temperature in the processing chamber 5 track the environmental temperature. The example of the effect of improvement of the processing accuracy will be referred to also in the explanation of one example (FIG. 6) of the processed object which will be given later.

The temperature adjustment part 19 may raise the temperature of the processing fluid which is supplied to the nozzle 7 by the difference between the measured temperature of the external temperature sensor 15 and the measured temperature of the internal temperature sensor 13 which is lower than the measured temperature of the external temperature sensor 15.

In this case, for example, the difference between the temperature in the processing chamber 5 and the environmental temperature is defined as the amount of temperature rise of the processing fluid as it is. Therefore, initial setting of control etc. are easy. For example, the gain to be multiplied with the difference between the temperature in the processing chamber 5 and the environmental temperature need not be investigated.

In the supply step, the processing fluid may be made to contact the rotating tool 101 and the atomized processing fluid scattered from the tool 101 may be filled in the processing chamber 5. From another viewpoint, the temperature adjustment step of the present embodiment may be applied to a manufacturing method in which processing and supply of the processing fluid are carried out in such a manner.

In this case, for example, the influence of the temperature of the processing fluid exerted upon the temperature of the atmosphere in the processing chamber 5 is large. Therefore, the effect of improvement of accuracy by the temperature adjustment step effectively acts.

The tool 101 may be a cutting blade having a cutting edge on its outer periphery (in another expression, may include a cutting blade).

In the cutting blade, for example, the diameter from the rotation axis to the cutting edge (from another viewpoint, cutting region) is relatively large, therefore the processing fluid contacting the cutting blade is apt to be scattered and filled in a mist state in the processing chamber 5. Accordingly, for example, the effect of improvement of accuracy according to the temperature adjustment step further effectively acts.

(Example of Workpiece)

Figure 6:
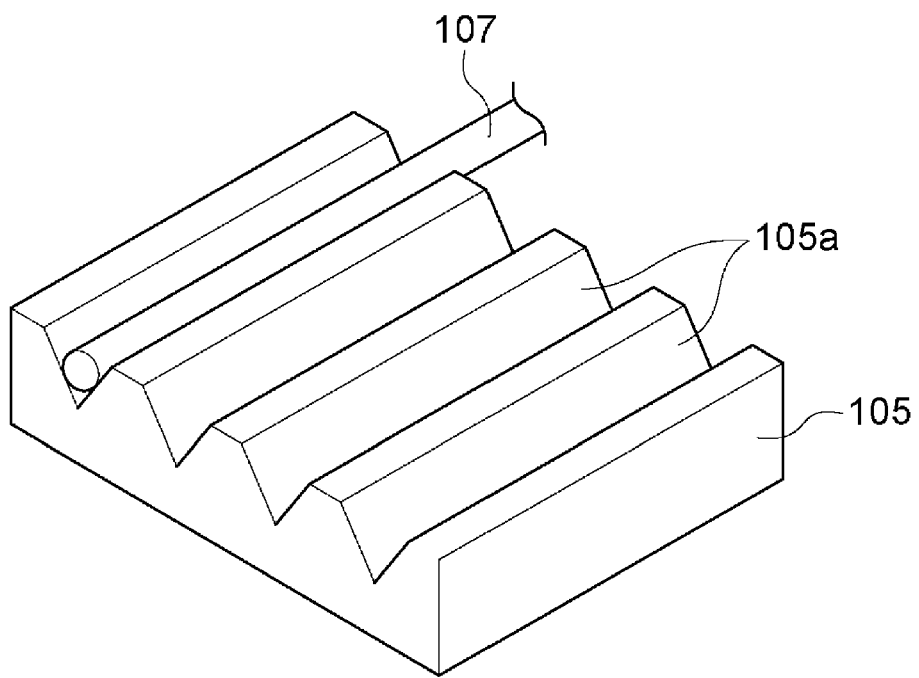
FIG. 6 is a schematic perspective view showing an example of a processed object manufactured according to the processing machine of FIG. 1.

FIG. 6 is a perspective view showing an example of the processed object 105 manufactured by the processing machine 1.

The processed object 105 is for example a substrate made of glass. On the upper surface of the substrate, a plurality of V-grooves 105a in which a plurality of optical fibers 107 (only one is illustrated in FIG. 6) are arranged are formed. These V-grooves 105a are formed by the cutting blade as the tool 101.

The plurality of optical fibers 107 held upon the processed object 105, for example, although not particularly shown, are arranged so that their end surfaces face a plurality of optical parts (lenses or optical fibers) and are optically connected to the plurality of optical parts. In order to improve the positioning accuracy between the plurality of optical fibers 107 and the plurality of optical parts at this time, a high processing accuracy is demanded in the shapes and dimensions of the V-grooves 105a and the pitch of the plurality of V-grooves 105a. Accordingly, the manufacturing method of the present embodiment is effective for manufacturing such a processed object 105.

The inventor of the present application confirmed by experiments the effect of improvement of the accuracy by the temperature in the processing chamber 5 being made to track the environmental temperature. Specifically, the processed object 105 was manufactured by a known ultraprecision slicer. Further, the processed object 105 was manufactured also by the processing machine according to the embodiment in which the temperature of the processing fluid was raised by the difference between the temperature in the processing chamber 5 and the environmental temperature in the above known ultraprecision slicer. Further, for each of the processed objects 105, the accumulated value of error of the pitch of the plurality of V-grooves 105a was measured. As a result, the accumulated value of the error in the case of processing by the known ultraprecision slicer was about 1 μm at the maximum. Contrary to this, the accumulated value of the error where processing was carried out by the processing machine 1 according to the embodiment was about 0.2 μm at the maximum. That is, the processing accuracy was improved to about 5 times.

The art according to the present disclosure is not limited to the above embodiment and may be realized in different variations.

For example, in the embodiment, an extremely high processing accuracy is illustrated, and a relatively small processed object is illustrated. However, the art according to the present disclosure may be applied to a relatively large-sized processed object having a relatively large allowance.

REFERENCE SIGNS LIST

1 . . . processing machine, 3 . . . machine body, 5 . . . processing chamber, 7 . . . nozzle, 13 . . . internal temperature sensor, 15 . . . external temperature sensor, 19 . . . temperature adjustment part, 101 . . . tool, and 103 . . . workpiece.

The invention claimed is:

1. A processing machine in which a nozzle supplying a processing fluid to a region where a workpiece is processed by a tool is arranged, comprising:
   a machine body configured to drive at least one of the workpiece and the tool to process the workpiece by the tool,
   a processing chamber which isolates the workpiece, the tool, and the nozzle from at least part of the machine body while housing the workpiece, the tool, and the nozzle,
   an internal temperature sensor configured to measure a temperature of an atmosphere in the processing chamber,
   an external temperature sensor configured to measure a temperature of an atmosphere around the processing machine, and
   a temperature adjustment part which performs at least one of:
      an operation of raising a temperature of the processing fluid to be supplied to the nozzle in response to a measured temperature obtained by the internal temperature sensor being lower than a measured temperature obtained by the external temperature sensor, and
      an operation of lowering the temperature of the processing fluid to be supplied to the nozzle in response to the measured temperature obtained by the internal temperature sensor being higher than the measured temperature obtained by the external temperature sensor.

2. The processing machine according to claim 1, wherein the temperature adjustment part is configured to raise the temperature of the processing fluid which is supplied to the nozzle by a difference between the measured temperature of the external temperature sensor and the measured temperature of the internal temperature sensor which is lower than the measured temperature of the external temperature sensor.

3. A method of manufacturing a processed object comprising:
- processing a workpiece to the processed object by a tool by using a processing machine comprising:
  - a machine body which drives at least one of the workpiece and the tool, and
  - a processing chamber which isolates the workpiece, the tool, and the nozzle from at least part of the machine body while housing the workpiece, the tool, and the nozzle;
- supplying the processing fluid from the nozzle to a region where the workpiece is processed by the tool in parallel with the processing;
- measuring a temperature of an atmosphere in the processing chamber;
- measuring a temperature of an atmosphere around the processing machine; and
- performing at least one of:
  - an operation of raising a temperature of the processing fluid to be supplied to the nozzle in response to a measured temperature of the atmosphere in the processing chamber being lower than a measured temperature of the atmosphere around the processing machine, and
  - an operation of lowering the temperature of the processing fluid to be supplied to the nozzle in response to the measured temperature of the atmosphere in the processing chamber being higher than the measured temperature of the atmosphere around the processing machine.

4. The method of manufacturing the processed object according to claim 3, wherein during the supplying, the processing fluid is made to contact the tool rotating, and atomized processing fluid scattered from the tool is filled in the processing chamber.

5. The method of manufacturing the processed object according to claim 4, wherein the tool includes a cutting blade comprising a cutting edge on its outer periphery.

6. The method of manufacturing the processed object according to claim 5, wherein:
- the workpiece is a substrate made of glass; and
- the processing comprises forming a plurality of V-grooves in a surface of the substrate, the plurality of V-grooves being configured to accept a plurality of optical fibers individually arranged therein.

* * * * *